United States Patent [19]
Stiles et al.

[11] 3,746,407
[45] July 17, 1973

[54] FERROHYDRODYNAMIC LOW-FRICTION BEARING

[75] Inventors: John C. Stiles, Thousand Oaks; Robert H. Tuffias, Costa Mesa; Roger W. Blakely, Jr., Granada Hills, all of Calif.

[73] Assignee: Litton Systems, Inc., Beverly Hills, Calif.

[22] Filed: Aug. 13, 1971

[21] Appl. No.: 171,691

[52] U.S. Cl.................. 308/36.3, 277/80, 308/9
[51] Int. Cl. ............................................ F10c 33/82
[58] Field of Search ............... 308/1, 9, 36.3, 122, 308/10; 277/80

[56] References Cited
UNITED STATES PATENTS

| 3,439,961 | 4/1969 | Stiles | 308/9 |
| 3,620,584 | 11/1971 | Rosensweig | 277/80 |
| 3,497,273 | 2/1970 | Munderman et al. | 308/9 |
| 3,097,853 | 7/1963 | McHugh | 277/80 |
| 3,612,630 | 10/1971 | Rosensweig | 308/10 |
| 3,377,113 | 4/1968 | Wilson | 308/10 |
| 3,503,658 | 3/1970 | Remmers | 308/9 |

FOREIGN PATENTS OR APPLICATIONS

| 783,881 | 10/1957 | Great Britain | 277/80 |

Primary Examiner—Charles J. Myhre
Assistant Examiner—Barry Grossman
Attorney—Alan C. Rose, Donald J. Ellingsberg et al.

[57] ABSTRACT

A self-contained, full-film hydrodynamic bearing utilizing (1) the hydrodynamic properties of a ferrofluid (colloidal suspension of magnetic particles) to produce support pressures in the bearing by an applied viscous pumping action, and (2) the magnetic properties of the ferrofluid to retain the fluid within the bearing.

20 Claims, 10 Drawing Figures

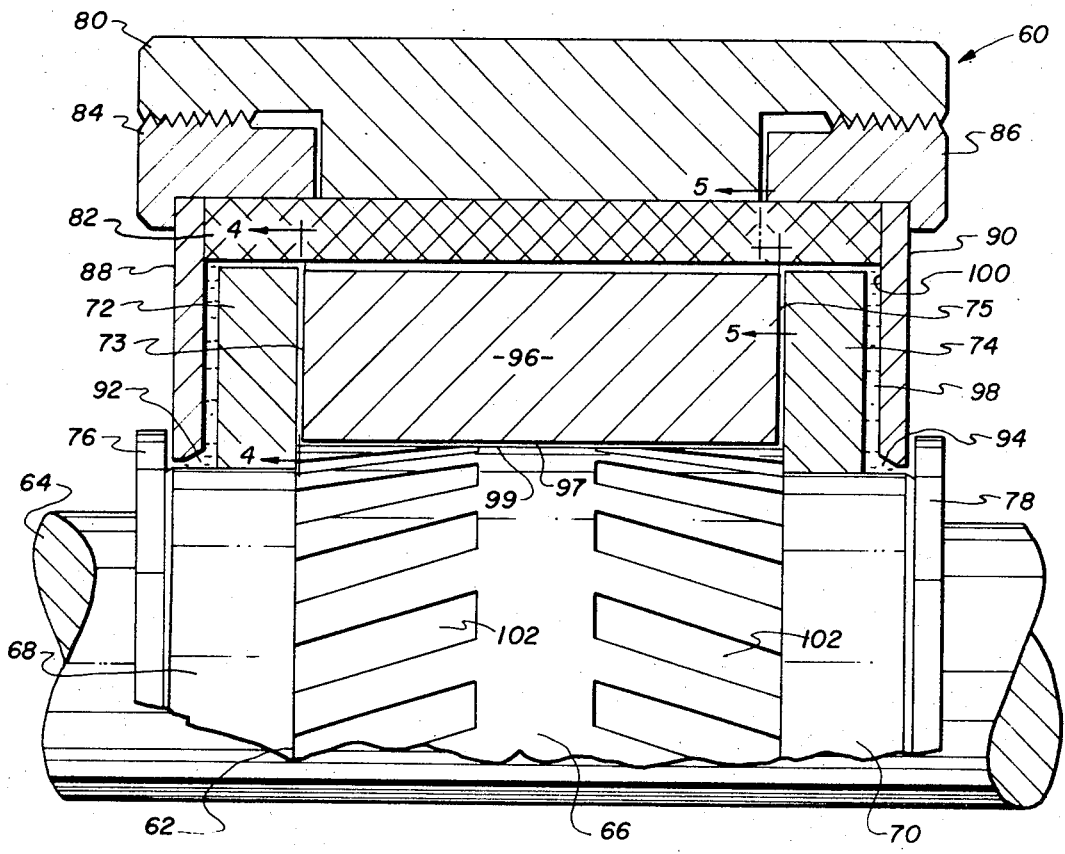
FIG. 3
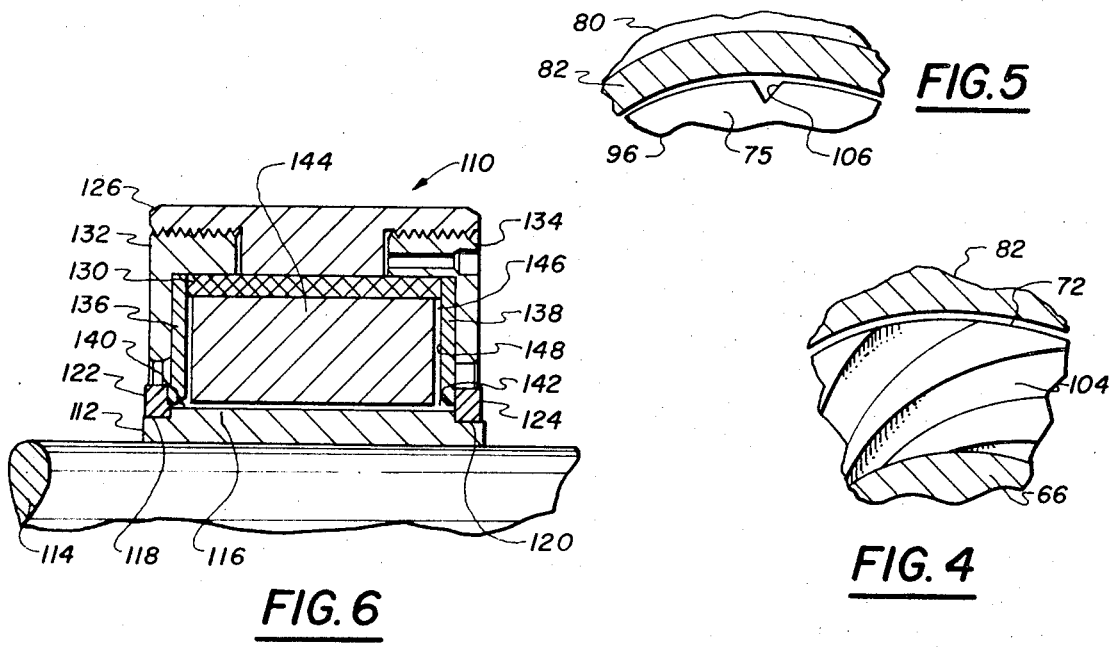
FIG. 5
FIG. 6
FIG. 4

FERROHYDRODYNAMIC LOW-FRICTION BEARING

BACKGROUND OF THE INVENTION

Low-friction bearings are critical to the operation of certain machine systems, particularly sensitive inertial instruments.

Conventionally, ball bearings have provided low-friction supports but as the development of machine systems progressed, improved bearings were required with quiet running characteristics and long operating life. Since ball bearings could not always satisfy these requirements, low-friction bearings were developed that employ a fluid medium or lubricant, which can be either a liquid or a gas, for the support of an applied load.

The liquid-type, low-friction bearing is generally used where a continuous lubricant supply is available because conventional fluid film low-friction bearings do not provide an adequate seal means to retain the fluid in the bearing. Liquid-type, low-friction bearings also experience substantial viscous damping under certain operating conditions.

Gas bearings are substantially quiet in operation and have, at least theoretically, an infinite life. Although a gas bearing provides for the separation of bearing surfaces during operation, it does not eliminate wear of the bearing surfaces during starting and stopping. Gas bearings also have a high starting torque because of the direct contact between the bearing surfaces during starting. Further, gas bearings are susceptible to contamination because of the small running clearance between the bearing surfaces.

Since liquids have a higher viscosity than gases, liquid lubricated bearings have a lower shear rate and have a reduced bearing surface area to sustain the same bearing load when compared to gas lubricated bearings. Therefore, a requirement exists for improved liquid-lubricant, low-friction bearings that can overcome the prior art problems both of conventional ball bearings and of gas bearings while combining the most attractive features of both bearing systems.

OBJECTS OF THE INVENTION

Accordingly, it is an object of the invention to provide a new and improved liquid lubricant, low-friction bearing, and more particularly a new and improved ferrohydrodynamic low-friction bearing.

It is an object of the invention to provide a ferrohydrodynamic bearing having an incompressible fluid lubricant suitably retained in the bearing.

It is an object of the invention to provide a ferrohydrodynamic bearing having improved static and dynamic bearing characteristics.

It is an object of the invention to provide a ferrohydrodynamic bearing that has low power consumption and low starting torque.

It is an object of the invention to provide a ferrohydrodynamic bearing that is substantially vibrationless.

It is an object of the invention to provide a ferrohydrodynamic bearing that has a relative high stiffness and load capacity with small size.

It is an object of the invention to provide a ferrohydrodynamic bearing that has a low noise level.

It is an object of the invention to provide a ferrohydrodynamic bearing that is resistant to contamination.

It is an object of the invention to provide a ferrohydrodynamic bearing that has a relatively infinite life at a reasonable cost to produce.

It is an object of the invention to provide a ferrohydrodynamic bearing that minimizes loss of lubricant during vacuum operation.

SUMMARY OF THE INVENTION

Briefly, in accordance with one form of the invention, a new and improved ferrohydrodynamic low-friction bearing is provided having a bearing assembly that includes at least first and second members for the support of a load, and a magnetizable fluid having a colloidal suspension of magnetic particles that develops a lubricant film contact with the first and second members. The bearing has a magnetic seal that acts upon and retains the magnetizable fluid so that the developed lubricant film between the first and second members is maintained without leakage of the fluid. Thus, the magnetizable fluid and the magnetic seal coact and develop a zero-leakage fluid seal in the bearing.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawings.

BRIEF DESCRIPTION OF THE DRAWINGS

FIG. 3 is a sectional view, partly broken away, of another form of ferrohydrodynamic bearing of the invention.

FIG. 4 is a sectional view, partly broken away, along the line 4—4 of FIG. 3.

FIG. 5 is a sectional view, partly broken away, along the line 5—5 of FIG. 3.

FIG. 6 is a sectional view, partly broken away, of another form of ferrohydrodynamic bearing of the invention.

DESCRIPTION OF THE INVENTION

Figure 1:
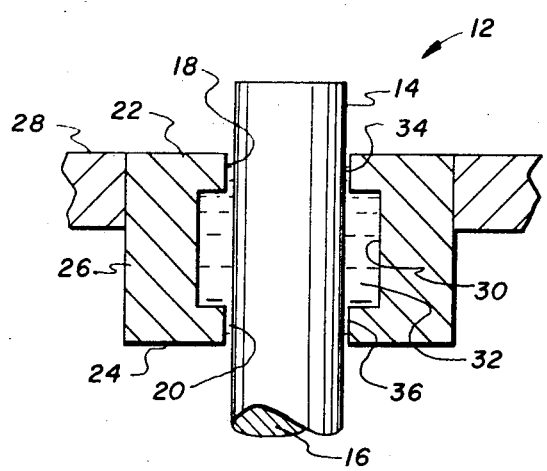
FIG. 1 is a sectional view, partly broken away, of one form of ferrohydrodynamic bearing of the invention.

Referring to FIG. 1, one form of bearing assembly 12 has a journal portion 14 of a rotatable shaft 16 positioned through axially-aligned and spaced-apart apertures 18 and 20 in respective end portions 22 and 24 of a magnet 26. The magnet 26 is supported by a member 28 which can be a housing member. A chamber 30 is developed within the magnet 26 and suitably filled with a ferromagnetic fluid 32.

The magnet 26 of the bearing assembly 12 of FIG. 1 develops a magnetic seal at air gap 34 between the outer surface of journal 14 and the inner surface of aperture 18 at end portion 22. Similarly, a magnetic seal is developed at air gap 36 between the journal portion 14 and the aperture 20 at end portion 24. The end portions 22 and 24 of magnet 26 act as pole shoes or magnet flux concentrators which direct the magnetic flux set up by the magnet 26.

The ferromagnetic fluid 32 has magnetic particles of subdomain size colloidally dispersed in a liquid carrier. A typical magnetic particle size is 100 Angstroms ($4 \times 10^{-7}$ in.), so that thermal agitation by impact of liquid molecules prevents the particles from settling or separating under the action of gravity or strong magnetic fields; that is, Brownian movement. The ferromagnetic fluid 32 can have different liquid bases; for example, water, kerosene, silicon oil, etc. One limitation for the choice of a carrier liquid base is that the liquid should be compatible with the magnetic particle surface coating. While the liquid properties of the liquid carrier can change with the addition of the magnetic particles to form the ferromagnetic fluid, a sufficient number of compatible liquid carriers are available so that any reasonable combination of liquid carrier properties can be achieved.

The ferrohydrodynamic fluid 32 for the bearing assembly 12 of FIG. 1 can have as a liquid carrier base a dielectric heat transfer fluid having the following properties:

| | |
|---|---|
| Absolute viscosity at 170°F | 1.0 cp |
| −65°F | 25.0 cp |
| Pour Point | −140°F |
| Density at 77°F | 0.892 gm/cm$^3$ |
| Coefficient of thermal expansion | 0.000576 cm$^3$/cm$^3$/°F |
| Vapor Pressure at 170°F | 5 mmHg |
| Saturation Magnetization | 200 gauss |

The magnet 26 of the bearing assembly 12 of FIG. 1, as previously described, develops a concentrated magnetic field at air gap 34 and air gap 32 between the stationary magnet 26 and the journal portion 14 of the rotating shaft 16. The ferromagnetic fluid 32, because of the previously described magnetic characteristics, at and as attracted to the air gaps 34 and 36 which are areas of concentrated magnetic flux densities, develops a zero-leak seal at each of the air gaps. Such magnetic seals can be leak-free to approximately forty pounds per square inch absolute.

The magnetic seals developed at the air gaps 34 and 36 eliminate contamination to the bearing from the environment that surrounds the bearing assembly, and also eliminate the requirement for a continuous lubricant supply since the magnetic seals contain the fluid lubricant in the bearing assembly.

Figure 2:
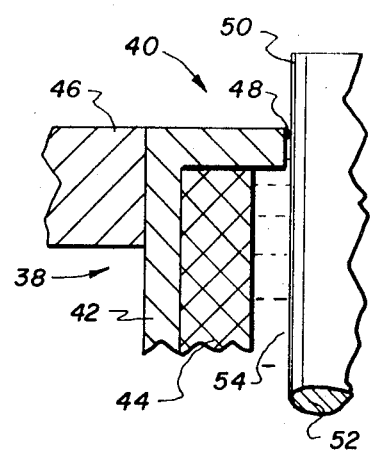
FIG. 2 is a sectional view, partly broken away, of another form of ferrohydrodynamic bearing of the invention.

FIG. 2 illustrates another form of bearing assembly 38 having an electromagnet 40 that includes a core 42 and a coil 44 formed from a wound conductor which is electrically connected to a source of electrical power (not shown). The electromagnet is supported by member 46 which can be a housing member. The core 42 of the electromagnet is suitably configured to develop an air gap 48, similar to the air gaps 34 and 36 shown by FIG. 1, between the stationary bearing assembly 38 and a journal portion 50 of a rotatable shaft 52. A ferromagnetic fluid 54 is contained by the magnetic seal developed at the air gap 48 as previously described for the bearing assembly 12 of FIG. 1.

Referring to FIG. 3, a spool bearing assembly 60 has a journal member 62 fixed to a rotatable shaft 64 and rotatable therewith. The journal member 62 has an intermediate land portion 66 suitably formed between journal end portions 68 and 70. Thrust pad or plate members 72 and 74 are respectively positioned on and connected to journal end portions 68 and 70, and are longitudinally spaced apart by the intermediate land portion 66 of the journal member 62. The thrust pad members 72 and 74 are rotatable with the journal member 62. A pair of flanged members 76 and 78 are respectively positioned in an abutting relationship with the journal end portions 68 and 70, and are connected thereto so that the flange members are rotatable with the journal member 62. The flange members 76 and 78 extend outwardly beyond the journal end portions 68 and 70 for the purpose of assisting in the magnetic seal for the spool bearing assembly 60 as will be described hereinafter in greater detail. The foregoing components are rotatable with the shaft 64 and comprise the rotating or rotor portion of the bearing assembly 60 as illustrated by FIG. 3.

The spool bearing assembly 60 of FIG. 3 has a support member 80 which can be connected to or be an integral part of a housing member (not shown). A magnet 82 is positioned within the support member 80 and retained therein by similar threaded clamp nut members 84 and 86 that are threaded into adjustable engagement with support member 80. The clamp nut members 84 and 86, respectively, maintain pole shoe members 88 and 90 in direct contact with the magnet 82. The inwardly extending pole shoe members 88 and 90 develop a desired path for the magnetic flux field which is set up by the magnet and act to concentrate the magnetic flux at respective air gaps 92 and 94. An inwardly extending center member 96, suitably connected to and nonrotatable with the magnet 82, extends into a channel generally defined by the intermediate land portion 66 and thrust pad members 72 and 74. The foregoing components comprise the stationary or stator portion of the spool bearing assembly 60 of FIG. 3.

The previously described rotating and stationary components of the spool bearing assembly 60 of FIG. 3 are maintained in a desired spaced apart relationship by a ferromagnetic fluid 98 that fills a chamber 100 generally bounded by the air gaps 92 and 94. The ferromagnetic fluid 98 is in film contact with the confronting surfaces of the rotor and stator portions of the spool bearing assembly 60 of FIG. 3.

As illustrated by FIG. 3, the spool bearing assembly 60 can be regarded as a combination of a journal bearing and a double-acting thrust bearing. The journal bearing is formed by intermediate land portion 66 and the confronting inner surface 97 of center member 96. When a radial load is applied to shaft 64, the bearing becomes eccentric in a conventional manner so that the fluid thickness varies in fluid gap 99 between land portion 66 and inner surface 97 of center member 96. The viscous drag that moving land portion 66 exerts on the fluid 98 impels the fluid within the fluid gap 99 and builds up a hydrostatic pressure which, in the steady state, balances the radial load applied to shaft 64.

Hydrodynamic journal bearings, however, are potentially unstable. This instability can be prevented by cutting grooves 102 into the confronting surface of the land portion 66 which act to equalize the fluid pressure distribution. When the grooves 102 have a spiral characteristic, such as shown by FIG. 3, the grooves also act to impel the fluid 98 toward the center of the bearing, i.e., the center of the intermediate land portion 66, which further prevents seal leakage from the bearing assembly by decreasing the fluid pressure at the magnetic air gaps 92 and 94.

The double-acting thrust bearing component of the bearing assembly 60 of FIG. 3 includes a thrust pad members 72 and 74, and the confronting end surfaces 73 and 75, respectively, of center member 96. Thrust pad members 72 and 74 each have a pattern of spiral grooves 104 as shown by FIG. 4, cut into the surface so that the viscous drag of grooves 104 on the fluid 98 also impels the fluid toward the center of the bearing thus increasing the fluid pressure at or towards the bearing center while decreasing the fluid pressure at the air gaps 92 and 94. Under an axial or thrust load, the rotor portion of the bearing assembly 60 will deflect so that the clearance between one of the thrust pad members, either 72 or 74, and the respective end surfaces 73 or 75 of center member 96 diminishes while the clearance at the other end increases. This causes the end with the diminished clearance to become more effective as a pump and produces a greater pressure rise while the pressure at the end with the larger gap diminishes. The steady state results when the force produced by the difference in the pressures at each end is equal and opposite to the applied load.

It is necessary, however, to provide flow channels, such as flow channel 106 as illustrated by FIG. 5, between the end surfaces 73 and 75 of member 96 to prevent load support pressures developed under an axially applied load to the spool bearing assembly from forcing the fluid 98 out through the magnetic seal developed at air gaps 92 and 94. The similar flow channels 106 are suitably positioned and spaced apart in a predetermined relationship dependent upon the operating characteristics to which the spool bearing assembly is subjected.

The spool bearing assembly 60 of FIGS. 3, 4 and 5 develops a zero-leak magnetic seal at each of the air gaps 92 and 94 in a manner similar to that previously described for the bearing assembly 12 of FIG. 1.

Referring to FIG. 6, a journal bearing assembly 110 has journal member 112 fixed to a rotatable shaft 114 and rotatable therewith. The journal member 112 has an intermediate land portion 116 suitably formed between journal end portions 118 and 120. A pair of flanged members 122 and 124 are respectively positioned on and connected to journal end portions 118 and 120 so that the flanged members are rotatable with the journal member 112. The flanged members 122 and 124 extend outwardly for the purpose of assisting in the magnetic seal for the journal bearing assembly 110 similar to that previously described for the spool bearing assembly 60 of FIGS. 3 and 4. The foregoing components rotatable with the shaft 114 comprise the rotating or rotor portion of the journal bearing assembly 110 as illustrated by FIG. 6.

The stationary FIG. 6 stator portion of the journal bearing assembly 110 of FIG.6 has a support member 126 which can be connected to or be an integral part of a housing member (not shown). A magnet 130 is positioned within the support member 126 and retained therein by similar clamp nut members 132 and 134 that are connected to the support member 126. The clamp nut members 132 and 134, respectively, maintain pole shoe members 136 and 138 in direct contact with the magnet 130 so that the inwardly extending pole shoe members develop a desired path for the magnetic flux field which is set up by the magnet, and further act to concentrate the magnetic flux at respective air gaps 140 and 142. An inwardly extending center member 144 is suitably connected to and nonrotatable with the magnet 130. The foregoing components comprise the stationary or stator portion of the journal bearing assembly 110 of FIG. 6.

The rotor portion and stator portion of the journal bearing assembly 110 of FIG. 6 are maintained in a desired spaced apart relationship by a ferromagnetic fluid 146 that completely fills a chamber 148 which is generally developed in the confines or boundaries as defined by the air gaps 140 and 142. The ferromagnetic fluid 146 is maintained in film contact with the confronting surfaces of the center member 144 and the intermediate land portion 116 of the previously described rotor and stator portions of the journal bearing assembly 110.

The intermediate land portion 116 of the journal bearing assembly 110 of FIG. 6 has an external surface which is suitably formed with a plurality of inwardly directed grooves (not shown) that are similar to the inwardly directed grooves as previously described for the spool bearing assembly 60 of FIGS. 3, 4, and 5.

The journal bearing assembly 110 of FIG. 6 develops a zero-leak magnetic seal at each of the air gaps 140 and 142 in a manner similar to that previously described for the bearing assembly 12 of FIG. 1.

Figure 7:
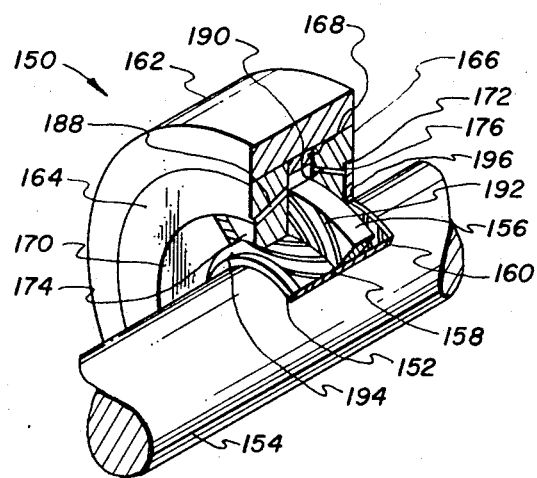
FIG. 7 is a perspective view, partly sectional and partly broken away, of another form of ferrohydrodynamic bearing of the invention.
Figure 8:
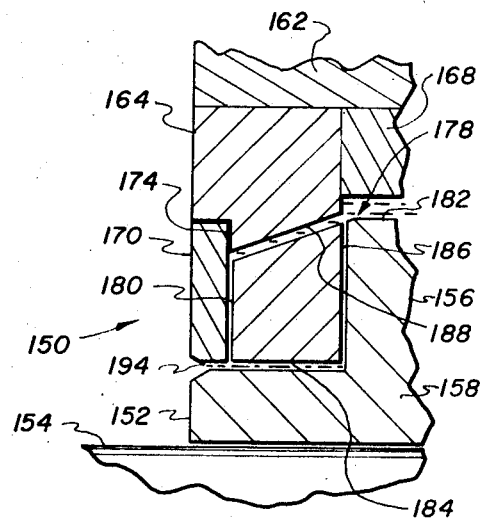
FIG. 8 is an enlarged sectional view, partly broken away, of the ferrohydrodynamic bearing of FIG. 7.

Referring to FIGS. 7 and 8, another bearing assembly 150 for axial and radial loads has a journal member 152 fixed to a rotatable shaft 154 and rotatable therewith. The journal member 152 has an outwardly extending flange portion 156 and adjacent journal end portions 158 and 160. These components, which are rotatable with the shaft 154, comprise the rotor portion of the bearing 150 as illustrated.

The stationary or stator portion of the bearing assembly 150 of FIGS. 7 and 8 has a support member 162 which can be connected to or be an integral part of a housing member (not shown). A pair of spaced apart and inwardly extending flange members 164 and 166 are connected to the support member 162 and are respectively positioned generally adjacent flange portion 156 and journal end portion 158 and 160 of the journal member 152. An inwardly extending center member 168 is positioned between the flange members 164 and 166 and maintained in a spaced apart relationship with the major outward dimension of flange portion 156 of the journal member 152. The flange members 164 and 166 in cooperation with the center member 168 generally define a channel that receives the outwardly extending flange portion 156 of the journal member 152. Magnets 170 and 172, which can be permanent magnets suitably formed into the illustrated cylindrical washer configuration, are respectively positioned in annular grooves 174 and 176 that are formed in respective flange members 164 and 166. The foregoing components comprise the stationary or stator portion of the bearing assembly 150 of FIGS. 7 and 8.

The rotor portion and stator portion of the bearing assembly 150 of FIGS. 7 and 8 are maintained in a desired spaced apart relationship by a ferromagnetic fluid 178, see in particular FIG. 8, that completely fills a first resevoir 180 and a second resevoir 182 as well as interconnecting flow path channels 184 and 186 between the confronting bearing surfaces. Each of the flange members 164 and 166 has a plurality of similar pressure relief ports, such as pressure relief ports 188 and 190, suitably spaced in the flange members. The ferromagnetic fluid 178 is in film contact with the confronting surfaces developed by the respective components as previously described which comprise the rotor and stator portions of the bearing assembly 150 of FIGS. 7 and 8.

As more particularly shown by FIG. 7, the outwardly extending flange portion 156 and the journal end portions 158 and 160 of the journal member 152 have a plurality of similar outwardly diverging grooves 192 that pump the ferromagnetic fluid 178 to develop positive support pressures between the rotor and stator components. The desired radial support function of the bearing assembly is developed as described for the bearing assembly 60 as shown in FIGS. 3, 4 and 5, while axial support is provided through the positive load support pressures that are developed between the flange members 164 and 166 and the engaging flange portion 156 of the journal member 152. The pressure relief ports, such as ports 188 and 190, allow fluid to circulate through the bearing, which prevents excessive pressure from increasing at a magnetic seal developed at each air gap 194 and 196 between the respective magnets 170 and 172 and the adjacent journal end portions 158 and 160. In a manner similar to that previously described for the bearing assembly 12 of FIG. 1, the concentrated magnetic field developed at each of the air gaps provides a zero-leak seal with the desirable advantages which have been previously set forth in the description of the bearing assembly of FIG. 1.

Figure 9:
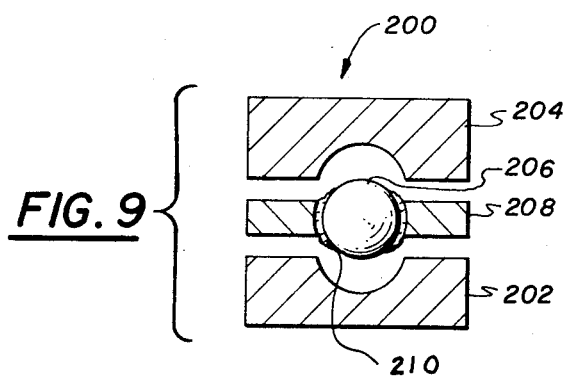
FIG. 9 is an exploded, sectional view, of another form of ferrohydrodynamic bearing of the invention.

In FIG. 9, a ball bearing assembly 200 has an inner race member 202 and an outer race member 204 with a plurality of similar rolling elements, such as ball 206, maintained in rolling contact with each of the race members in a conventional manner. A rolling-element separator 208 is suitably magnetized and becomes a source for a magnetic flux field that confines a ferromagnetic fluid lubricant 210 in a manner similar to that as previously described and illustrated for the bearing assembly 12 of FIG. 1. The concentrated magnetic field set up by the magnetic rolling element separator 208 can retain a resevoir of lubricant that is substantially larger than the amount provided by the conventional porous retainer, thus extending bearing life.

Figure 10:
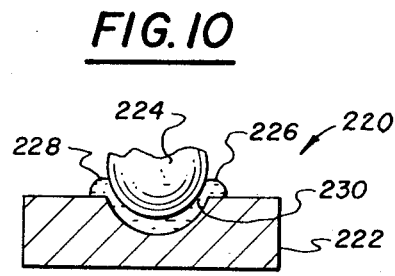
FIG. 10 is a sectional view, partly broken away, of another form of ferrohydrodynamic bearing of the invention.

Referring to FIG. 10, A partially illustrated bearing assembly 220 has a race 222 with a rolling element, such as ball 224. The race 222 is suitably magnetized and sets up a desired magnetic flux field to contain a ferromagetic fluid lubricant 226 by a magnetic seal developed at air gaps 228 and 230 in a manner similar to that previously described for the bearing assembly 12 of FIG. 1. Again, the concentrated magnetic flux field at each of the air gaps 228 and 230 retains a supply of lubricant substantially larger than can be obtained with previous techniques such as retainer configuration.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

We claim:
1. A bearing assembly comprising:
  a. bearing means for the support of a load including at least first and second members,
  b. single magnetizable fluid means developing a selected seal and lubricant film contact with said first and second members, and
  c. magnetic seal means acting upon and retaining said single magnetizable fluid so that the desired lubricant film contact as developed is maintained without leakage of said fluid means.
2. The bearing assembly of claim 1 in which said magnetic seal means includes:
  a. manget means developing a magnetic flux field, and
  b. magnetic flux concentrator means on said second member spaced apart from said first member concentrating the developed magnetic flux field through said magnetizable fluid means at and generally adjacent said concentrator means.
3. The bearing assembly of claim 2 in which said magnet means is a permanent magnet.
4. The bearing assembly of claim 2 in which said magnet means is an electromagnet.
5. The bearing assembly of claim 1 in which said single magnetizable fluid means is a ferromagnetic fluid.
6. The bearing assembly of claim 5 in which said ferromagnetic fluid includes:
  a. a carrier liquid, and
  b. magnetic particles of subdomain size collodially dispersed in said carrier liquid by Brownian movement.
7. The bearing assembly of claim 6 in which said magnetic particles are magnetic ferrite.
8. The bearing assembly of claim 1 in which said bearing means includes:
  a. fluid path means controlling the developed lubricant film contact; and
  b. pump means forcing said fluid means along said fluid path means.
9. The bearing assembly of claim 8 in which said fluid path means includes:
  a. a pumping and stabilizing region between said first and second members, and
  b. pressure relief means in fluid communication with said region for the controlled movement of said fluid means in said region.
10. The bearing assembly of claim 9 in which said pressure relief means is a plurality of spaced ports.
11. The bearing assembly of claim 8 in which said pump means includes a plurality of selectively spaced grooves formed in at least one of said first and second members and oriented to force said fluid means along said fluid path means.
12. The bearing assembly of claim 11 in which said first member includes an intermediate portion having said grooves and said second member is positioned outwardly adjacent to said intermediate portion and operatively spaced therefrom by said developed lubricant film contact therebetween so that a desired radial support is developed by the bearing assembly.
13. The bearing assembly of claim 12 in which said first member further includes thrust means having said grooves and being positioned laterally adjacent to said second member and operatively spaced therefrom by said developed lubricant film contact therebetween so that both a desired radial and axial support are developed by the bearing assembly.

14. The bearing assembly of claim 13 in which said thrust means includes at least first and second thrust pad members with said intermediate portion positioned therebetween.

15. The bearing assembly of claim 11 in which said grooves are outwardly diverging in the direction of rotation of said rotatable one of said first and second members.

16. The bearing assembly of claim 1 in which said bearing means is a rolling-contact bearing having a plurality of rolling elements and said first and second members are respectively first and second races separated by said rolling elements.

17. The bearing assembly of claim 16 in which said magnetic seal means is a magnetized separator positioning associated ones of said rolling elements in a spaced relationship to each other.

18. The bearing assembly of claim 17 in which said rolling elements are balls.

19. The bearing assembly of claim 16 in which said magnetic seal means is a magnetized one of at least one of said first and second races.

20. The bearing assembly of claim 19 in which said first and second races are magnetized.

\* \* \* \* \*